(12) United States Patent
Corda et al.

(10) Patent No.: US 9,032,048 B2
(45) Date of Patent: May 12, 2015

(54) METHOD FOR TOP-UP INFORMATION AND COMPUTER DEVICE

(75) Inventors: Alexandre Corda, Nice (FR); Vincent Lemonnier, Saint-Laurent-du-Var (FR); Baptiste Affouard, Golfe Juan (FR)

(73) Assignee: NXP, B.V., Eindhoven (NL)

( * ) Notice: Subject to any disclaimer, the term of this patent is extended or adjusted under 35 U.S.C. 154(b) by 39 days.

(21) Appl. No.: 13/257,200

(22) PCT Filed: Feb. 25, 2010

(86) PCT No.: PCT/IB2010/050820
§ 371 (c)(1),
(2), (4) Date: Sep. 16, 2011

(87) PCT Pub. No.: WO2010/106452
PCT Pub. Date: Sep. 23, 2010

(65) Prior Publication Data
US 2012/0011228 A1    Jan. 12, 2012

(30) Foreign Application Priority Data
Mar. 19, 2009   (EP) ..................................... 09290206

(51) Int. Cl.
*G06F 15/16* (2006.01)
*H04M 1/725* (2006.01)
*H04L 29/08* (2006.01)

(52) U.S. Cl.
CPC ........ *H04M 1/7253* (2013.01); *H04M 2250/04* (2013.01); *H04L 67/16* (2013.01)

(58) Field of Classification Search
CPC ....................................................... G06F 15/16

USPC .................................................. 709/217–219
See application file for complete search history.

(56) References Cited

U.S. PATENT DOCUMENTS

| | | | |
|---|---|---|---|
| 2007/0038854 A1 | 2/2007 | Cheon et al. | |
| 2008/0081608 A1* | 4/2008 | Findikli et al. | 455/425 |
| 2009/0036103 A1* | 2/2009 | Byerley et al. | 455/414.1 |
| 2010/0159888 A1* | 6/2010 | Sigmund et al. | 455/413 |
| 2012/0011228 A1* | 1/2012 | Corda et al. | 709/219 |

FOREIGN PATENT DOCUMENTS

| | | |
|---|---|---|
| CN | 1835007 A | 9/2006 |
| CN | 101359383 A | 4/2009 |

OTHER PUBLICATIONS

NFC Forum, Essential for successful NFC Mobile Ecosystems Oct. 2008. http://www.nfc-forum.org/resources/white_papers/NFC_Forum_Mobile_NFC_Ecosystem_White_Paper.pdf.*

(Continued)

*Primary Examiner* — Vivek Srivatava
*Assistant Examiner* — Sibte Bukhari

(57) ABSTRACT

In a method for processing top-up data, a server (8) receives data related to a request for issuing an NFC application (9). The data were sent by an NFC mobile device (3) and are intended for a Service Provider (2). At the server (8) transformed data are generated by transforming the data related to the request into a format complying with the Server Provider (2). The transformed data are sent to the Service Provider (2) for further processing and issuing the NFC application (9) to the mobile device (3) particularly utilizing a Trusted Service Manager (1).

10 Claims, 3 Drawing Sheets

(56) References Cited

OTHER PUBLICATIONS

"Mobile NFC Services", GSMA, retrieved from the internet at: http://www.gsmworld.com/documents/nfc_services_0207.pdf, 24 pgs. (Feb. 1, 2007).

Nordlund, S. "Secure Over-The Air Services in NFC Ecosystems", retrieved from the internet at: http://www.nfc-research.at/fileadmincongress/pdf/05_Venyon_Sirpa_Nordlund.pdf, 26 pgs. (Mar. 20, 2007).

"Mobile NFC Technical Guidelines—Version 2.0", GSMA, retrieved from the internet at: http://www.gsmworld.com/documents/nfc/gsma_nfc2_wp.pdf, 95 pgs. (Nov. 2007).

International Search Report for Int'l Patent Appln. No. PCT/IB2010/050820 (Aug. 5, 2010).

NFC Congress, "From NFC Pilots towards commercial roll-outs—status update and ecosystem requirements"; Hagenberg; pp. 1-29; Feb. 27, 2008.

* cited by examiner

METHOD FOR TOP-UP INFORMATION AND COMPUTER DEVICE

FIELD OF THE INVENTION

The invention relates to a method for top-up information and to a computer device.

BACKGROUND OF THE INVENTION

Near Field Communication, abbreviated "NFC", is a short-range high frequency wireless communication technology enabling exchange of data between devices within a relative short distance, for instance, about 10 centimeters. NFC is based on RFID (radio frequency identification) and combines an interface of a smartcard and a reader into a single device. NFC devices can communicate with RFID readers and with other NFC devices and may, for instance, be mobile phones.

Business opportunities presented by using NFC enabled mobile devices, such as mobile phones, for, for instance, contactless payment, transport ticketing, loyalty and other services may be of interest, for instance, for mobile operators and service providers in the banking, transport and retail sectors.

For addressing operational requirements, NFC utilizes a so called Trusted Service Manger (TSM) which is supposed to help service providers to securely distribute and manage, for instance, contactless services for their customers utilizing networks of mobile operators. FIG. 1 illustrates how a Trusted Service Manager Backend 1 is conventionally used to transmit an NFC application 9 issued by a Service Provider Backend 2 (service provider web site) to a mobile telephone 3 comprising NFC capability.

If the service provider wants to issue the NFC application 9 to the mobile phone 3, he connects his Service Provider Backend 2 to the mobile phone 3 through the Trusted Service Manager Backend 1. The Trusted Service Manager Backend 1 establishes a secure channel to transmit the NFC application 9 over the air OTA to the mobile phone 3 which includes an appropriate interface which is, for instance, a GSM interface not explicitly shown in the figures.

The mobile phone 3 comprises a proxy 4, a secure application 5, also known as "wallet" or trusted application, to present information about NFC applications already installed on the mobile phone 3 to the user of the mobile phone 3, an NFC module including a Service Manager 6 and a memory 7 to store the NFC application. The secure application 5 is also responsible to allow the user to top-up applications, for instance, to request to reload an NFC application. If, for instance, the NFC application is associated with an e-purse, the request may, for instance, be a request to reload money on this e-purse.

Top-up information is located in the secure application 5 (wallet) itself. Top-up information is proprietary formatted information. Therefore, if a new NFC application is issued to the mobile phone 3 by a new service provider, the user has to install an up-dated version of his/her wallet including top-up information for this new NFC application.

It is an object of the invention to provide an improved method to top-up information particularly usable by wallets.

OBJECT AND SUMMARY OF THE INVENTION

The object of the invention is achieved by means of a method for processing top-up data, comprising the steps of:

receiving at a server data related to a request for issuing an NFC application which were sent by an NFC device and are intended for a Service Provider, generating at the server transformed data by transforming the data related to the request into a format complying with the Server Provider, and transferring the transformed data to the Service Provider for further processing and for issuing the NFC application to the mobile device particularly utilizing a Trusted Service Manager.

The object of the invention is also achieved by means of a computer device, comprising a server device configured to carry out the inventive method. If an NFC mobile device, such as a mobile hand set, for instance, a mobile phone, needs top-up an application, particularly an NFC application run on the mobile device, the mobile device needs to contact the appropriate Service Provider to have him issue the requested application. Since it may happen that the request sent by the mobile device does not comply with the Service Provider's needed information, the communication between the NFC mobile device and the Service Provider Backend cannot be directly performed. Due to the transforming of the data sent by the mobile phone into data formatted such they comply with the addressed Service Provider, the Service Provider, i.e. its Backend can transfer the requested top-up or NFC application to the mobile device utilizing, for instance, the well known Trusted Service Manager.

The server transforming the data may be associated with the Trusted Service Manager or may be part of the Trusted Service Manager. Since the Trusted Service Manager manages loading up requested NFC applications or their top-ups, the Trusted Service Manager can centrally administer the transforming of the reformatted data in a relatively effective manner.

Transforming the data into a format complying with the Service Provider may carried out by reformatting the data into a format complying with the Service Provider.

The data related to the request may include information retrieved from a secure application of the mobile device. A secure application is also referred to as "wallet". Normally, in an NFC ecosystem, it is the responsibility of this wallet, which is also called "trusted application", to present to the user of the mobile device information about the NFC applications already installed in the NFC mobile device. Usually, the purpose of the wallet is also to allow the user to top-up, i.e. to request to reload an NFC application. An example of such a request is to request to reload a certain amount of money, for instance, 15 Euros on his/her NFC e-purse, if the mobile device comprises such an e-purse.

The retrieved information may particularly be related to the user of the mobile phone particularly to an ID of the user. Then, the Service Provider can allocate the request to the appropriate mobile device and to the appropriate user. The latter may be important if the Service Provider needs to contact the user or bill him/her for the request.

In order to transform the ID retrieved by the secure application and received at the server, the server may be configured to transform the format of the ID as retrieved by the secure application to a format complying with the Service Provider. As discussed above, it may happen that the Service Provider does not understand the request sent by the mobile phone directly, for instance, if the user ID required by Service Provider Backend may be different from the user ID added by the secure application (wallet). Due to the inventive computer device, i.e. the introduced server, a particularly common formatted data related to the request sent by the mobile device is translated into proprietary data, particularly top-up data, understandable by the Service Provider, i.e. its Backend.

Applications of the inventive method or the inventive computing device may comprise NFC mobile devices, such as NFC mobile phones, over the air (OTA) provisioning, NFC applications and top-up reloading.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DETAILED DESCRIPTION OF EMBODIMENTS

Figure 1:
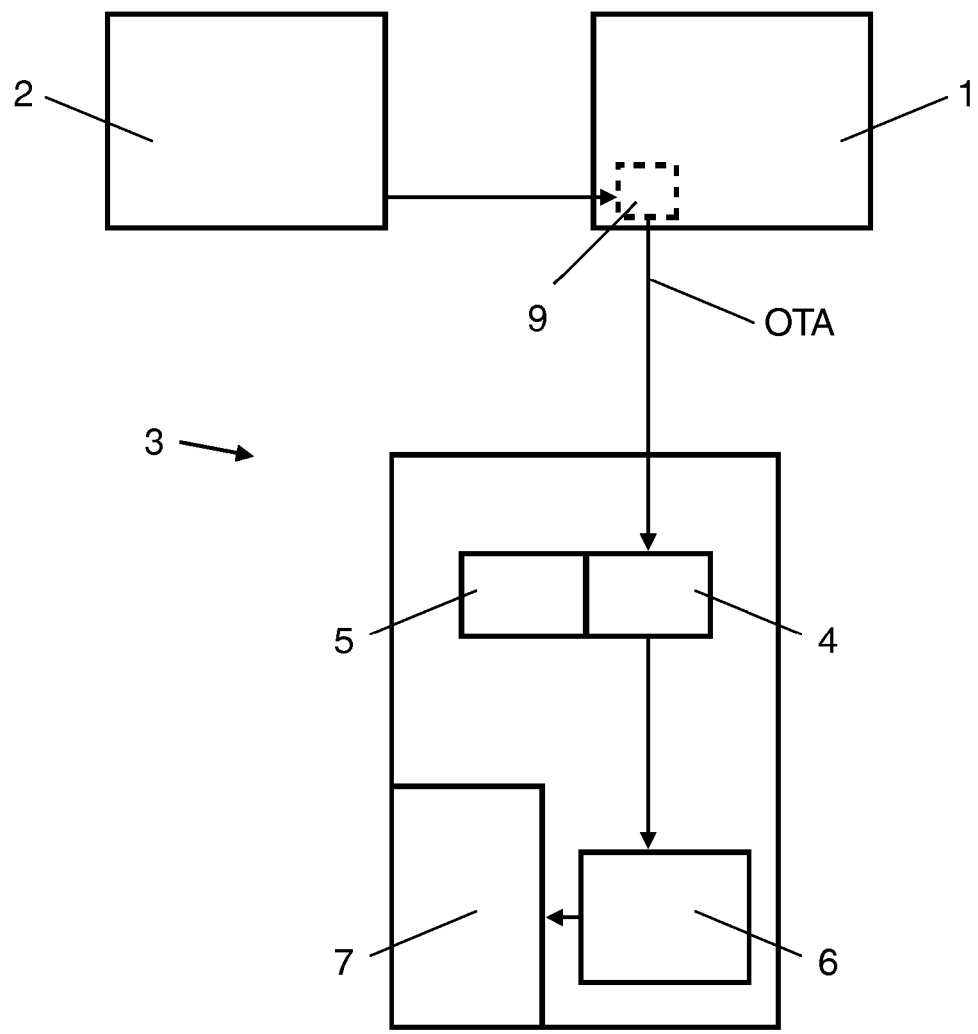
FIG. 1 is a diagram illustrating transferring an NFC application from a Trusted service provider to an NFC device in a conventional manner.

FIG. 1 has been discussed in the introduction.

Figure 2:
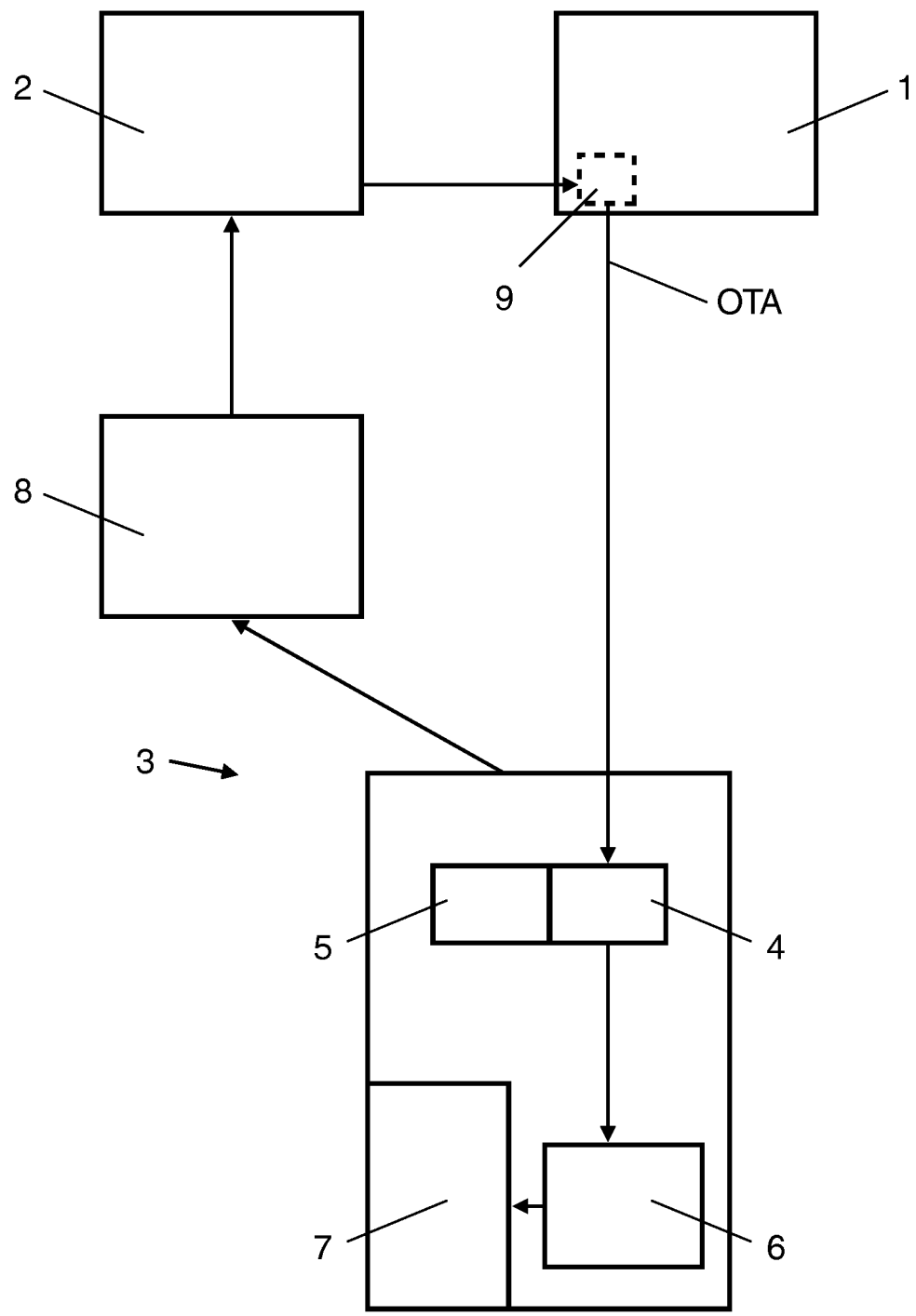
FIG. 2 is a diagram illustrating a method to top-up an NFC application.

FIG. 2 shows the mobile phone 3 as an example of a hand set which includes NFC capabilities. The mobile phone 3 is thus an example of an NFC mobile device.

FIG. 2 further shows the Trusted Service Manager Backend 1 and the Service Provider Backend 2 operated by the Service Provider.

Figure 3:
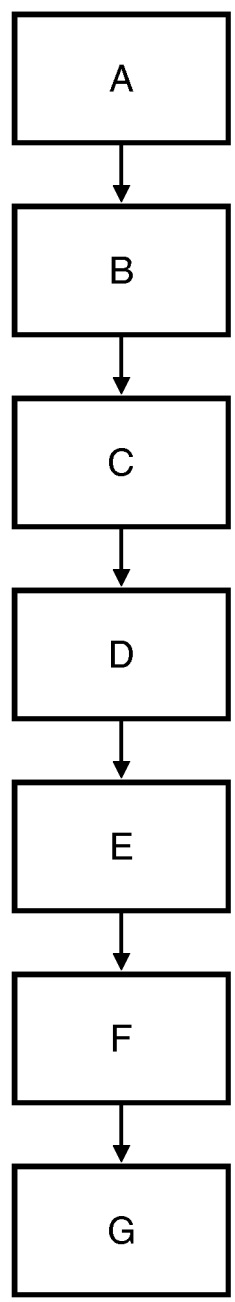
FIG. 3 is a flow chart illustrating the top up of the NFC application.

Each time a new NFC application is issued to the mobile phone 3, the secure application 5 ("wallet") retrieves specific information about this NFC application, step A of the flow chart of FIG. 3. This task may be, for instance, performed when the relevant NFC application is issued, once a day, or on the user's demand. The secure application 5 also retrieves top-up data corresponding to the relevant application. The top-up data correspond to the specific NFC application and usually do not comprise information about the user at this step.

When the user of the mobile phone 3 requests a top-up, the secure application 5 processes the top-up data to add information related to the current user, for instance, the user's ID, step B of the flow chart of FIG. 3.

For instance, if the mobile phone 3 requests the top-up data from a new service provider, then the top-up data sent from the mobile phone 3 generally do not match the information or format needed for processing the request by the relevant Service Provider Backend 2. For instance, the format of the user's ID required by the current Service Provider Backend 2 may differ from the format of the user's ID added by the secure application 5. Then, direct communication between the mobile phone 3 and the Service Provider Backend 2 for issuing the NFC application 9 is not possible.

For the exemplary embodiment, a server, from now on denoted as top-up server 8, is utilized. The top-up server 8 may be linked to the Trusted Service Management Backend 1 or may even be incorporated into the Trusted Service Management Backend 1.

For the exemplary embodiment, if the mobile phone 3 requests the new NFC application 9, the mobile phone 3, utilizing its secure application 5, does not connect directly to the relevant Service Provider Backend 2 utilizing, for instance, the service provider's URL (Uniform Resource Locator), but sends the request including the top-up data and the service provider's URL to the top-up server 8, step C of the flow chart of FIG. 3. The top-up server 8 is configured to accept and to process the request in order to transform the request into a format acceptable to the addressed Service Provider Backend 2. For this purpose, the top-up server 8 may include a table or a data base which includes information about the specific formats required by several Service Provider Backends 2 utilizing, for instance, their URLs.

As a result, the top-up server 8 is configured to translate a common format for top-up data, i.e. NFC application related data as well as information added by the secure application 5, into proprietary top-up data which the relevant Service Provider Backend 2 can understand and thus process.

Then, the top-up server 8 connects to the addressed Service Provider Backend 2 utilizing, for instance, its URL and transfers the reformatted request which complies with the format of the relevant Service Provider, step D of the flow chart.

The addressed Service Provider Backend 2 can then check the validity of the transformed top-up data and can perform certain specific actions associated with the request, such a sending a bill to the user, step E of the flow chart.

For the exemplary embodiment, the Service Provider Backend 2 connects then to the Trusted Service Management Backend 1 to request to load the requested NFC application 9 to the mobile phone 3, step F of the flow chart. Then, the Trusted Service Manager Backend 1 transfers the NFC application 9 to the mobile phone 3, step G of the flow chart.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method for processing top-up data, comprising:
receiving, at a server that is situated between an NFC mobile device and a Service Provider, data related to a request for issuing an NFC application, the data being sent by the NFC mobile device and intended for the Service Provider, wherein the data includes an ID of a user of the NFC mobile device;
generating at the server transformed data by transforming the data from a first format into a second, different, format complying with the Service Provider, wherein transforming the data from the first format into the second, different, format comprises transforming the ID of the user into a second, different, user ID required by the Service Provider, and
transferring the transformed data to the Service Provider for further processing and for issuing the NFC application to the mobile device,
wherein the data is related to a request for issuing the NFC application and a request for reloading a monetary value on the NFC application, and wherein transferring the transformed data to the Service Provider comprises transferring the transformed data to the Service Provider for further processing and for issuing the NFC application and reloading the monetary value on the NFC application to the mobile device.

2. The method of claim 1, wherein the data related to the request include information retrieved from a trusted application of the mobile device and/or the URL of the Service Provider.

3. The method of claim 1, comprising transforming at the server a format of the ID as retrieved by the trusted application to a format complying with the Service Provider.

4. The method of claim 1, wherein the server is associated with the Trusted Service Manager or the Trusted Service Manager comprises the server.

5. The method of claim 1, wherein the NFC mobile device is a mobile phone.

6. A computer device, comprising a server device configured to carry out the method of claim 1.

7. The computer device of claim 6 being associated with a Trusted Service Manager or being part of the Trusted Service Manager.

8. The method of claim 1, wherein the first format is a common format, and wherein the second format is a proprietary format that is understandable by the Service Provider.

9. The method of claim 1, wherein the server is not a part of the Trusted Service Manager, the NFC mobile device and the Service Provider.

10. The method of claim 1, wherein the data includes the ID of the user of the NFC mobile device and the URL of the Service Provider.

* * * * *